United States Patent

Huggins et al.

[11] Patent Number: 5,741,842
[45] Date of Patent: Apr. 21, 1998

[54] THERMOPLASTIC MOULDING COMPOUNDS, A PROCESS FOR THEIR PREPARATION AND A PROCESS FOR THE PRODUCTION OF CERAMIC OR METAL MOULDED PARTS BY SINTERING

[75] Inventors: John Huggins, Leverkusen; Gebhard Wagner, Odenthal; Ottfried Schlak, Cologne, all of Germany

[73] Assignee: Bayer Aktiengesellschaft, Leverkusen, Germany

[21] Appl. No.: 604,258

[22] Filed: Feb. 16, 1996

Related U.S. Application Data

[63] Continuation of Ser. No. 179,402, Jan. 10, 1994, abandoned, which is a continuation-in-part of PCT/EP92/01466 Jun. 30, 1992, now abandoned.

[30] Foreign Application Priority Data

| | | | |
|---|---|---|---|
| Jul. 10, 1991 | [DE] | Germany | 41 22 764.6 |
| Oct. 21, 1991 | [DE] | Germany | 41 34 694.7 |
| Apr. 15, 1992 | [DE] | Germany | 42 12 593.6 |

[51] Int. Cl.$^6$ .................................... C08L 83/06
[52] U.S. Cl. .................. 524/500; 524/506; 524/588; 524/430; 501/88
[58] Field of Search .................. 524/588, 430, 524/500, 506; 501/88

[56] References Cited

U.S. PATENT DOCUMENTS

| | | | |
|---|---|---|---|
| 3,090,691 | 5/1963 | Weyer | 501/41 |
| 3,719,630 | 3/1973 | Antonen | 524/780 |
| 4,888,376 | 12/1989 | Atwell et al. | 524/401 |
| 4,929,573 | 5/1990 | Atwell et al. | 501/137 |
| 5,053,092 | 10/1991 | Lachman | 156/89 |

FOREIGN PATENT DOCUMENTS

| | | |
|---|---|---|
| 2142581 | 3/1972 | Germany . |

OTHER PUBLICATIONS

A. Lee Smith, Analysis of Silicones, John Wiley & Sons, Chemical Analysis, pp. 154–156.

I. W. Michaeli, et al., Frei gestalten, Industrie–Anzeiger 36, pp. 12–14, (1991).

P. Glutz, et al., Spritzgiessen und Sintern keramischer und metallischer Präzisionsteile, Feinwerktechnik & Messtechnik. 97, pp. 363–365, (1989).

W. Noll, Chemistry and Technology of Silicones, Academic Press, pp. 190–198, (1968).

V. Fritz Aldinger, et al., Angewandte Chemie, Angew. Chem., vol. 99, pp. 381–391, (1987).

M.J. Edirisinghe, et al., Review: Fabrication of Engineering Ceramics by Injection Moulding. I. Materials Selection, Int. J. High Technology Ceramics, vol. 2, pp. 1–31, (1986).

Primary Examiner—Ralph H. Dean
Attorney, Agent, or Firm—Sprung Kramer Schaefer & Briscoe

[57] ABSTRACT

A thermoplastic moulding composition containing at least one sinterable ceramic or metal powder and a mixture of thermoplastic binders, wherein one of the binders is a silicone resin and the second binder is an organic resin. The silicone resin has the a softening point of 40° to 150° C. and an average formula of:

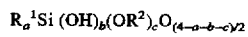

$$R_a^1 Si(OH)_b(OR^2)_c O_{(4-a-b-c)/2}$$

wherein a is in the range of 0.95 to 1.2 c is in the range of 0 to 0.2 the sum of a+b+c is 1.05 to 1.5 the sum b+c is at most 0.3

$R^1$ denotes methyl and $R^2$ denotes one or more of $C_1$–$C_{18}$ alkyl radicals.

10 Claims, No Drawings

THERMOPLASTIC MOULDING COMPOUNDS, A PROCESS FOR THEIR PREPARATION AND A PROCESS FOR THE PRODUCTION OF CERAMIC OR METAL MOULDED PARTS BY SINTERING

This application is a continuation of application Ser. No. 08/179,402, filed Jan. 10, 1994, now abandoned, which is a continuation-in-part of application PCT/EP92/01466, filed Jun. 30, 1992 which is now abandoned in the U.S.

The present invention relates to new thermoplastic moulding compounds for the production of ceramic or metal moulded parts from the corresponding ceramic or metal powders. Thermoplastic moulding compounds are used inter alia in processes such as injection moulding, extrusion or hot pressing which require temperature dependent flow properties.

It is known that sinterable ceramic or metal powders combined with thermoplastic binders and other auxiliary substances can be worked up into moulded parts by injection moulding, extrusion or hot pressing (F. Aldinger and H. J. Kalz *Angew. Chem.* 99 (1987) 381-391; P. Glutz *Feinwerktechnik & Messtechnik* 97 (1989) (363-365); M. J. Edirisinghe, J. R. G. Evans; *Inter. J. High Technology Ceramics* 2 (1986) 1-31; W. Michaeli, R. Bieler; *Ind.-Anz.* 113 (1991) 12-14). After the compounds have been moulded, the binder is removed or burnt out from the moulded part (known as green compact) at temperatures from 200° to 1000° C.

The green compact is then generally sintered at temperatures above 1000° C., a process which may be accompanied by partial or complete phase conversion and result in compacting of the body.

Purely organic binders are generally used in this process, for example: Polystyrene, polyethylene, polypropylene, polybutylacrylates or paraffin waxes. Organic binders have, however, the disadvantage that their removal by firing must be carried out slowly and with very careful temperature control as the green compacts obtained would otherwise have severe faults such as cracks or pores. In some cases, the green compacts obtained have insufficient strength after firing. Sufficient strength of the green compact is necessary for subsequent processing of the compact and perfect sintering.

Silicone resins have already repeatedly been described as binders for the production of ceramics. Silicone resins have the advantage that the silicone resin binder is not converted into ceramics during firing, and the moulded part can therefore be fired more rapidly. The silicone resins hitherto described, however, are not suitable for processes entailing thermoplastic processing such as, for example, injection moulding.

US 3 090 691 describes a process for the production of moulded parts of ceramics which is characterised by firing a mixture of an organosiloxane and a ceramic powder. The organosiloxane has a total of 1 to 3 organic groups per silicon atom. The mixtures are fired at 500° to 1550° C. and generally contain a hardening catalyst such as, for example, lead oxide or lead stearate.

DE-A 2 142 581 describes compositions for the production of aluminium oxide ceramics which are characterised by low shrinkage during the sintering process due to the choice of suitable inorganic additives. Several binders are described but heat curable silicone resins are preferred. Polyethylene, polyvinyl chloride or a polyamide is preferred as binder for shaping by the injection moulding process.

DE-A 2 106 128 and DE-A 2 211 723 describe heat curable moulding compounds of inorganic solids and solvent-free liquid organosiloxanes which contain organic peroxides as hardening catalysts. The moulding compounds are introduced into a mould by pressure and cured at elevated temperature during the moulding process. The green compacts are subsequently after-hardened at 200° C. for 2 to 4 hours and then sintered for 32 hours at temperatures of up to 1510° C. to produce a solid ceramic product.

U.S. Pat. No. 4,888,376 and U.S. Pat. No. 4,929,573 describe a process for the production of moulded silicon carbide parts using heat curable polyorganosiloxanes as binders. The polysiloxanes are highly viscous to solid at room temperature. Pyrolysis of the polysiloxanes should give rise to at least 0.2% by weight of free carbon, based on the weight of the silicon carbide powder. In these processes, the polysiloxanes provide ceramic yields of only 39 to 50.8% by weight from pyrolysis in an inert gas atmosphere.

The silicone resins described have one or more disadvantages which make them unsuitable for thermoplastic moulding processes. Many of the silicone resins are liquid and must be hardened in the mould to produce a sufficiently strong moulded part. Hardening in the mould results in long cycle times and therefore high piece costs. Solid silicone resins which do not soften at elevated temperatures, i.e. the temperatures employed for processing, are also unsuitable for thermoplastic processing. Other silicone resins provide only low ceramic yields from pyrolysis at temperatures of up to 1000° C. A high ceramic yield is, however, a precondition for rapid, fault-free firing. There is therefore a technological demand for moulding compounds consisting of ceramic or metal powders and binders which have good thermoplastic processing properties and can be rapidly fired without additional hardening stages.

It has now been found that certain silicone resins have excellent thermoplastic properties as well as providing high ceramic yields from pyrolysis at up to 1000° C. Thermoplastic moulding compounds prepared with these silicone resins have excellent properties for thermoplastic processing, in particular processing by injection moulding and any after-treatment processes, and can be fired within a short period of time after moulding.

The binders according to the invention consist of a thermoplastic silicone resin or a thermoplastic mixture of several silicone resins having a softening temperature of from 30° to 200° C. and correspond to the following average formula:

$$R_a{}^1Si(OH)_b(OR^2)_cO_{(4-a-b-c)/2} \quad (I)$$

wherein the sum of (a+b+c)=from 1.05 to 1.7, the sum of (b+c) is at most 0.3, $R^1$ denotes one or more of the groups H, $C_1$- to $C_{18}$-alkyl, vinyl, allyl or phenyl and $R^2$ denotes one or more of the organic groups $C_1$- to $C_{18}$-alkyl, with the proviso that the average molecular weight (arithmetic mean) of the organic radicals including the alkoxy groups is at most 50 divided by the sum of (a+c).

The value for a should in particular be in the range of from 0.95 to 1.5, preferably from 1.0 to 1.5, particularly preferred 1.05 to 1.20, even more preferably from 1,10 to 1.18.

The value for c may be in the range of from 0 to 0.2, preferably from 0.05 to 0.15.

$R^1$ should in particular denote hydrogen, methyl, vinyl or phenyl, methyl and phenyl being preferred, and $R^2$ preferably stands for a $C_1$- to $C_4$-alkyl group.

According to the invention, the silicone resins are preferably used without catalysts so that further cross-linking and hardening during the shaping process does not take place.

To ensure good properties for thermoplastic processing combined with high strength of the moulded product, a resin having a very stiffly cross-linked $SiO_{x/2}$ network, i.e. one which is characterised by a sum of (a+b+c) close to 1, may contain more relatively high molecular weight organic radicals than one with a softer $SiO_{x/2}$ network characterised by a sum of (a+b+c) close to 1.7, which must contain a higher proportion of methyl groups.

For example, when the sum of (a+c) is 1, the average molecular weight of all the $R^1$s and $OR^2$s may be a maximum of 50. When the sum of (a+c) is 1.5, the average molecular weight should accordingly be a maximum of 50/1.5=33.

Resins in which the average molecular weight of the radicals is 40 divided by (a+c), more preferably 30 divided by (a+c), are preferred.

Particularly preferred are resins which contain at least 70%, preferably at least 80% of methyl groups in addition to phenyl, $C_2$–$C_{18}$-alkyl and vinyl groups.

Among the resins described by formula (I), the following resins II and III are particularly preferred:

(II). "QM" resin built up of the following structural units:

a) from 33 to 70 mol-% of $SiO_2$ units, b) from 0 to 20 mol-% of $R^1SiO_{3/2}$ units, c) from 0 to 40 mol-% of $R^1(CH_3)SiO$ or $Ph_2SiO$ units (IIA)

d) from 20 to 50 mol-% of $R^1(CH_3)_2SiO_{1/2}$ units and having an alkoxy content according to Zeisel (A. L. Smith, Analysis of Silicones", New York, Wiley, 1974, pages 155–156) of less than 20% and containing an average of from 1.0 to 1.5 organic substituents (attached to the Si—C bond) per silicon atom.

Among these, the resins built up of the following units are preferred:

| | |
|---|---|
| a) from 40 to 55 mol-% | of $SiO_2$ units, |
| b) from 10 to 35 mol-% | of $Ph_2SiO$, $Ph(CH_3)SiO$, (IIC) $(CH_2=CH)(CH_3)SiO$ or $(CH_3)_2SiO$ units and |
| c) from 20 to 40 mol-% | of $R^1(CH_3)_2SiO_{1/2}$ units |

Those built up of the following units are particularly preferred:

| | |
|---|---|
| a) from 50 to 62.5 mol-% | of $SiO_2$ units, |
| b) from 0 to 10 mol-% | of $Ph_2SiO$, $Ph(CH_3)SiO$, (IIB) $(CH_2=CH)(CH_3)SiO$ or $(CH_3)_2SiO$ units and |
| c) from 35 to 45 mol-% | of $R^1(CH_3)_2SiO_{1/2}$ units; |

(III). "TM" resins built up of the following structural units:

| | |
|---|---|
| a) from 50 to 98 mol-% | of $R^1SiO_{3/2}$ units, preferably |
| a1) from 50 to 95 mol-% | of $CH_3SiO_{3/2}$ units and |
| a2) from 0 to 20 mol-% | of $PhSiO_{3/2}$ units and/or $ViSiO_{3/2}$ units, |
| b) from 0 to 30 mol-% | of $Ph_2SiO$ or $R^1(CH_3)SiO$ units, preferably |
| b1) from 5 to 30 mol-% | of $(CH_3)_2SiO$ units and |
| b2) from 0 to 20 mol-% | of $Ph_2SiO$ units and/or $CH_3(R^1)SiO$ units, (IIIA) |
| c) from 0 to 33 mol-%, from 0 to 5 mol-% and | preferably of $SiO_2$ units, |
| d) from 0 to 10 mol-% | of $R^1(CH_3)_2SiO_{1/2}$ units, preferably |
| | of $(CH_3)_3SiO_{1/2}$ units, | with an average of from 1.0 to 1.5, preferably from 1.05 to 1.3, of organic substituents per silicon atom. The sum of all the trifunctional units a) and tetrafunctional units c) should be at least 70 mol-%, based on the total number of all units. Thermoplastic silicone resins consisting substantially of the following units are particularly preferred:

| | |
|---|---|
| a1) from 8.0 to 98 mol-% | of $CH_3SiO_{3/2}$ units, |
| a2) from 0 to 5 mol-% | of $PhSiO_{3/2}$ units, |
| b) from 0 to 20 mol-%, | preferably up to 12 mol-%, of $(CH_3)_2SiO$ units, (IIIB) |
| and | |
| d) from 0 to 10 mol-%, | preferably from 2 to 8 mol-%, of $(CH_3)_3SiO_{1/2}$ units. |

Among these, the resins which are free from $PhSiO_{3/2}$ are particularly preferred.

The thermoplastic silicone resins according to the invention should preferably have softening temperatures of from 40° to 200° C., in particular from 40° to 150° C., most preferably from 50° to 120° C., when only one silicone resin is used in the thermoplastic moulding compound.

Mixtures of silicone resins having differing softening temperatures have particularly advantageous properties. In such cases, a "soft" resin having a softening temperature of from 30° to 120° C., preferably from 40° to 100° C., may be used in admixture with a "hard" resin having a softening temperature of at least 60° C., and the difference in the softening temperatures is preferably at least 20° C., in particular at least 30° C.

The difference in the softening temperatures may amount to 100° C. or more but the mixture as such should still have a softening temperature of from 40° to 200° C., preferably from 40° to 150° C., even if the "hard" component contained therein has a higher softening temperature.

The softening temperature of the mixture is influenced by the softening temperature of the components and the quantitative ratio of the components in the mixture.

Quantitative ratios of "hard" to "soft" components of from 5:95% by weight to 95:5% by weight are used according to the invention.

A suitable "soft" silicone resin is a resin corresponding to formula (I) and (III-A) composed of the following structural units:

| | | |
|---|---|---|
| a) | from 75 to 95 mol-% of | $R^1SiO_{3/2}$ units, |
| b) | from 5 to 20 mol-% of | $R^1(CH_3)SiO$ units, |
| c) | from 0 to 5 mol-% of and | $SiO_2$ units, (IIIC) |
| d) | from 0 to 10 mol-% of | $R^1(CH_3)_2SiO_{1/2}$ units. |

Both TM and QM resins of formulae (I) and (IIIA) and (IIA) are suitable as "hard" silicone resins:

| | | |
|---|---|---|
| a) | from 85 to 98 mol-% of | $R^1SiO_{3/2}$ units |
| b) | from 0 to 5 mol-% of | $R^1(CH_3)SiO$ units (IIID) |
| c) | from 2 to 10 mol-% of | $R^1(CH_3)_2SiO_{1/2}$ units |
| or | | |
| a) | from 55 to 62.5 mol-% of $SiO_2$ units | |
| b) | from 0 to 5 mol-% of | $R^1(CH_3)SiO$ units (IID) |
| c) | from 33 to 45 mol-% of | $R^1(CH_3)_2SiO_{1/2}$ units |

Silicone resin mixtures containing a high proportion of hard TM or QM resin have great hardness and little tackiness in the cold state. Moulding compounds of such silicone resin mixtures are particularly preferred for the production of complicated and thin-walled moulded parts for which great strength is required to ensure that they will not be damaged during removal from the mould. The low tackiness of such silicone resin mixtures also facilitates removal from the mould so that mould release agents such as silicone oils are not necessary.

Silicone resin mixtures containing less hard TM or QM resin have less hardness and greater elasticity in the cold state. Moulding compounds of such silicone resin mixtures are particularly preferred for the production of thick-walled parts in which great tensions are liable to occur when the moulded part solidifies inside the mould. The elasticity of these silicone resin mixtures enables the tensions to be eliminated during firing, thereby preventing cracks and other faults in the fired part.

It has now been found that low proportions of hard TM or QM silicone resin according to the invention result in a considerable improvement in the hardness and in particular the tackiness of the moulding compounds. For most moulding operations, therefore, it is sufficient to use 10 to 50% by weight of the hard TM or QM silicone resin to ensure easy removal of the product from the mould.

The silicone resins according to the invention are prepared, for example, by co-hydrolysis of a corresponding chlorosilane or alkoxysilane mixture. If desired, a mixture of one or more alkoxysilanes and one or more siloxanes may first be equilibrated and then hydrolysed. Hydrolysis is carried out by the usual methods as described in W. Noll *Chemie und Technologie der Silicone* (Weinheim: Verlag Chemie, 1968, pages 162–169). For example, the chlorosilane mixture and an organic solvent may be added to an excess of water and optionally an aliphatic alcohol. The phases are separated and the organic phase is washed until neutral. The silicone resin is used either as a solution or as a solid after evaporation of the solvent to produce the moulding compounds according to the invention.

It is known that the alkoxy and SiOH content of silicone resins is reduced by condensation reactions, whereby their softening temperature can be increased. This procedure, often referred to as thickening of the silicone resin solution, is preferably carried out in the production of the silicone resin by heating in the presence of catalysts. Production of the silicone resins according to the invention must therefore be carried out under such conditions that the desired softening temperature is maintained. The silicone resins must also be carefully neutralised to ensure a stable viscosity during processing of the moulding compound.

In the solvent-free state, the silicone resins or silicone resin mixtures according to the invention are solids at room temperature with softening temperatures of from 30° to 200° C. Above this temperature, silicone resins or silicone resin mixtures are liquid to highly viscous. The silicone resin or silicone resin mixture preferably has a viscosity in the molten state of less than 100,000 mPa.s, preferably less than 10,000 mPa.s. The silicone resins are amorphous in the solid state. The temperature at which plastic flow begins therefore as a rule cannot be determined accurately. The softening temperature is therefore given as a temperature range extending over 10 to 15 centigrade degrees.

The silicone resins or silicone resin mixtures according to the invention are characterised by high ceramic yields, amounting to more than 60% by weight, preferably more than 70% by weight, after pyrolysis at temperatures of up to 1000° C. The ceramic yield is defined as the residue in percent by weight after pyrolysis. The ceramic yield is generally reduced with increasing proportions of $PhSiO_{3/2}$ and $Ph_2SiO$ units and siloxy units having long chain alkyl groups. The sum of these units therefore should not exceed 40 mol% and preferably does not exceed 20 mol%.

The thermoplastic moulding compounds according to the invention consist in their general formulation of a homogeneous mixture of at least one sinterable powder of ceramic or metal and at least one thermoplastic silicone resin or silicone resin mixture. In addition, the moulding compounds according to the invention may contain other auxiliary substances, such as sintering auxiliaries, flow improvers and mould release agents.

In another embodiment of the present invention, the thermoplastic moulding compounds may contain thermoplastic binders on an organic basis or copolymers of organic polymers with siloxanes in addition to the silicone resin. In the present invention, the advantage of rapid firing is based mainly on the choice of silicone resin. Other thermoplastic polymers, however, may improve the properties of the moulding compound during the shaping process without substantially increasing the firing time.

Any powders of metal or ceramic, including mineral raw materials for the production of ceramics, which are capable of being sintered to a solid body are suitable for the thermoplastic moulding compounds.

The sinterable powders used according to the invention are preferably powders of oxidic ceramics or non-oxidic ceramics or their raw materials, and hard metal, sintered metal, alloyed steel or pure metal.

Examples of preferred oxidic ceramics include $Al_2O_3$, $MgO$, $ZrO_2$, $Al_2TiO_5$, $BaTiO_3$ and silicate ceramics and their raw materials, such as porcelain and stoneware mixtures which may contain inter alia clay, feldspar and quartz. Examples of non-oxidic ceramics include SiC, $Si_3N_4$, BN, $B_4C$, AlN, TiN, TiC and others. Examples of sinterable hard metals include WC and TaC alloys. Silicon is an example of a sinterable metal which can be reacted with nitrogen at high temperatures to form silicon nitride. The powders may be used singly or as mixtures of different powders.

The sintering auxiliaries used, which accelerate the phase conversion or compacting during sintering at low temperatures by the formation of low melting phases, vary according to the ceramic or metal used. These sintering auxiliaries generally have no significant influence on the thermoplastic properties of the moulding compounds.

The organic based thermoplastic binders according to the invention are organic polymers and waxes which have a softening temperature of from 40° to 200° C., preferably from 40° to 160° C., most preferably from 70° to 130° C. Polyethylene, polypropylene, polystyrene, polyacrylates, polyesters and ethylene/vinyl acetate copolymers are examples. Polyethylene, polypropylene and their copolymers are preferred, as are also waxes based on polymers. Polar polyolefin waxes and mixtures thereof with apolar thermoplastic polymers are preferred. Neutral and polar waxes of mineral or natural occurrence, such as paraffin wax, montan wax, beeswax or plant waxes and their secondary products are also preferred. Thermoplastic copolymers of organic polymers with polydimethylsiloxanes or silicone resins are also preferably used. Examples of these are polyestersiloxane copolymers, so-called combination resins. One or more binders may be used together with the silicone resin.

The polar polyolefin waxes to be used according to the invention are waxes with acid numbers according to DIN 53 402 of from 5 to 180 mg KOH/g. Examples include the Trade Products Hostalub[(R)] H 22 and Hostamont[(R)] TP EK 581 of Hoechst AG and the polymer additives A-C[(R)] 540 and A-C[(R)] 629 of Allied-Corporation. The polar polyolefin waxes may have either low or high viscosities in the melt. Waxes having viscosities of from 10 to 200,000 mPa.s at 140° C. are preferred.

The thermoplastic organic binders according to the invention and their copolymers with siloxanes are used in the quantity required to produce an improvement in the properties during the shaping process or the properties of the moulded part but still enable a short firing time to be employed. As described above, organic thermoplasts must be completely removed from the green compact during firing. Too high a proportion of organic binders in the moulding compound therefore has an adverse influence on the firing time. Moulding compounds in which at least 10% by weight of the sum of all the binders and auxiliary substances consist of the silicone resins according to the invention are preferred. Moulding compounds containing a relatively small proportion of silicone resin are particularly suitable for the production of moulded parts in which the ceramic residue of the silicone resin is liable to have a negative effect on the properties of the moulded parts, such as moulded parts of non-oxidic ceramic. Moulding compounds in which at least 50% by weight of the sum of all the binders and auxiliary substances consist of silicone resins are preferably used when a very short firing time is desired.

In addition to containing the silicone resin or silicone resin mixture (and preferably the thermoplastic polymer), the thermoplastic moulding compounds according to the invention generally contain one or more flow improvers or mould release agents which lower the viscosity of the moulding compound during the moulding process and ensure neat removal from the mould. Examples include aliphatic acids and their salts and secondary products, such as stearic acid, calcium stearate, magnesium stearate, stearic alcohol, stearic acid amide, stearic acid ethyl ester or the like; oils such as polydimethylsiloxanes, polyethylene oxides, polypropylene oxides or copolymers of polydimethylsiloxane and polyethylene oxide or polypropylene oxide and the like or low molecular weight waxes such as paraffin wax, polyethylene oxide wax or beeswax. Moulding compounds containing from 0.25 to 10% by weight (based on the sum of all the binders and auxiliary substances) of stearic acid or salts and secondary products thereof or paraffin wax are preferred. As a rule, only sufficient flow improver is added to adjust the viscosity to the desired level for the moulding process.

The thermoplastic moulding compounds according to the invention contain at least sufficient silicone resin, thermoplastic organic polymers and other auxiliary substances to give rise to a thermoplastically processible mass. As a rule, the binder together with the other auxiliary substances must at least fill up the free spaces between the powder particles inside the mould. The quantities required vary according to the type of powder, the shape of the grain and the grain size distribution. It has been found in practice that from 25 to 60 vol % of binder are necessary. Moulding compounds containing from 50 to 70 vol % of powder and 30 to 50 vol of binders and auxiliary substances are preferred; powder contents of not less than 60 vol % are particularly preferred.

The thermoplastic moulding compounds according to the invention are solid at room temperature but capable of plastic deformation at temperatures above the softening temperature of the silicone resin used. In a preferred embodiment, the moulding compounds have viscosity of less than 10,000 Pa.s at the processing temperature. Viscosities of from 100 to 5000 Pa.s are particularly preferred.

The thermoplastic moulding compounds according to the invention are prepared by mixing the above-mentioned components at a temperature above the softening temperature of the silicone resin, optionally with removal of residues of solvent left from the preparation of the silicone resin. It is advantageous to employ high shearing forces in the mixing process in order to break down powder aggregates and thereby obtain a homogeneous mixture. Suitable mixing apparatus are, for example, kneaders, double shaft extruders and rolling mills. The moulding compounds may then either be used directly or first made up into powders or granulates.

The thermoplastic moulding compounds according to the invention have excellent properties for thermoplastic moulding such as injection moulding, extrusion or hot pressing. The moulding compounds may be plastically worked at temperatures above the softening temperature of the silicone resin and introduced under pressure into moulds whose temperature is below the softening temperature of the silicone resin. The moulding compound becomes solid again on cooling. The resulting green compacts have high strengths and may be worked or finished, for example by grinding, drilling or sawing. Residues obtained from the moulding process may be used again.

The thermoplastic moulding compounds according to the invention are particularly suitable for the production of complicated parts by moulding processes such as thermoplastic injection moulding. The moulding compounds have good flow properties at temperatures at least 20 Centigrade degrees above the softening temperature of the silicone resin used. The moulding compounds may contain high proportions of powder. The green compacts produced from the moulding compounds according to the invention undergo only comparatively slight weight loss when fired at temperatures of up to 1000° C. The green compacts may therefore be fired within a short time. The fired green compacts have great strength and high densities.

The green compacts produced from the moulding compounds according to the invention may be fired within a short time either in air or in an inert gas atmosphere or in a vacuum to give faultless results.

Firing is preferably carried out under a programme of temperatures rising by 0.1 to 5 Centigrade degrees per minute, preferably by 0.5 to 5 Centigrade degrees per minute up to 600°–1000° C. Moulding compounds based on silicone resin mixtures tolerate heating rates of up to 10 Centigrade degrees per minute. They may also be heated stepwise to a temperature of from 200° to 800° C. at the rate of 0.1 to 5 degrees Centigrade per minute, maintained at this temperature, if necessary until no more weight change is observed, and then heated to 1000° C. at the rate of 5 to 50 degrees Centigrade per minute. The fired green compacts may then generally be sintered at temperatures of from 1000° to 2000° C., depending on the powder and the sintering agent used.

The invention will now be further described with the aid of the following Examples.

EXAMPLES

General

The following substances were used in the Examples:

$Al_2O_3$ powder of Martinswerk GmbH under the name of Martinoxid ZPS-402 having an average particle size of 2.0–3.0 micron, a density of about 3.95 g/cm$^3$, an alpha-$Al_2O_3$ content above 95% and a loss on annealing of about 0.2% by weight, porcelain powder a raw material mixture for the production powder of porcelain ceramic consisting of about 50% of kaolin and about 50% of feldspar and quartz with an average particle size of 4 to 5 micron and a loss on annealing of 6.1%.

hard paraffin I
having a softening temperature of 52°–54° C.,
hard paraffin II
having a softening temperature of 90°–94° C.,
polystyrene
of the type Hostyren N 2000 of Hoechst AG,
polyethylene oxide
having a viscosity of 160 mPa.s at 25° C.,
polydimethyl siloxane
having a viscosity of 5000 mPa.s at 25° C.,
siloxane copolymer a 76% solution in toluene of a block copolymer copolymer of (40:60) polydimethylsiloxane and polyethylene oxide having an average molar mass of 4230 g/mol,
polar polyolefin wax of Hoechst AG named Hostalub H 22 and having a softening temperature of 103°–108° C., an acid number of 22–28 mg KOH/g, a saponification number of 45–65 mg KOH/g and a viscosity of about 300 mPa.s at 120° C.,
montan wax of Hoechst AG under the name of Hoechst-Wachs-E having a dripping point of 79°–85° C., an acid number of 15–20 mg KOH/g, a saponification number of 130–160 mg KOH/g, as density of 1.01 g/cm$^3$ and a viscosity at 100° C. of about 30 mPa.s,
copolymer wax an ethylene/vinyl acetate copolymer of Allied Corporation under the name of A-C Additive 400 having a vinyl acetate content of 13%, a dripping point of 95° C., a density of 0.92 g/cm$^3$ and a viscosity at 140° C. of about 600 mPa.s,
Dynasil 40 a silicic acid ester of Hüls Troisdorf AG of the formula (EtO)$_3$SiO(Si(OEt)$_2$O)$_n$Si(OEt)$_3$ (n=about 2.7 and Et=CH$_2$CH$_3$) having an SiO$_2$ content of 40% by weight.

Example 1 (Silicone resin 1)

Preparation of a silicone resin from CH$_3$SiCl$_3$, (CH$_3$)$_2$SiCl$_2$ and (CH$_3$)$_3$SiCl A mixture of 880 g of CH$_3$SiCl$_3$, 90 g of (CH$_3$)$_2$SiCl$_2$ and 12 g of (CH$_3$)$_3$SiCl was slowly added dropwise to a stirred mixture of 3.8 litres of water, 650 g of xylene and 650 g of n-butanol. The aqueous phase was separated off and the solution was washed three times with water. Xylene-n-butanol was then distilled from the resin solution to produce an 80% solution which was then diluted with toluene to give rise to a resin solution having a solids content of 64% by weight and a viscosity of 45 mPa.s at 25° C.

In the solvent-free state, silicone resin (1) is a solid having a softening temperature of 55° to 65° C., a viscosity at 130° C. of 500 mPa.s and a density of 1.18 g/cm$^3$. $^1$H NMR (300 MHz, CDCl$_3$, ppm): δ 0.15 (s, SiCH$_3$, Int: 150), 0.90 (mult, O(CH$_2$)$_3$CH$_3$, Int: 10), 1.35, 1.55 (mult, OCH$_2$(CH$_2$)2-CH$_3$, Int: 14), 2.3 (br, SiOH, Int: 0.9), 3.7 (mult, OCH$_2$, Int: 7). According to $^{29}$Si-NMR, the silicone resin contains 1.15 methyl groups per silicon atom. The molecular formula can be calculated from these values to be (CH$_3$)$_{1.15}$Si(O(CH$_2$)$_3$CH$_3$)$_{0.08}$(OH)$_{0.007}$O$_{1.38}$. The ceramic yield after pyrolysis at temperatures of up to 1000° C. (heating rate 1° C./min) in air was 76% by weight.

Example 2 (Silicone resin 2)

Preparation of the silicone resin from (CH$_3$)SiCl$_3$ and (CH$_3$)$_3$SiCl 420 g (2.81 mol) of methyltrichlorosilane and 24 g (0.22 mol) of trimethylchlorosilane were hydrolysed in 1.9 litres of water, 335 g of xylene and 335 g of n-butanol as in Example 1. The aqueous phase was separated off and the solution, which was still acid, was stirred for 30 minutes at 80° C. This solution was washed three times with water. Xylene-butanol was then distilled from the resin solution to give rise to a 77% resin solution.

In the solvent-free state, silicone resin (2) is a solid having a softening temperature of 70° to 75° C. and a density of 1.13 g.cm$^3$. According to $^{29}$Si-NMR, the silicone resin contains 1.17 methyl groups per silicon atom. The ceramic yield after pyrolysis at temperatures of up to 1000° C. (heating rate 1° C./min) in air was 74.2% by weight.

Example 3 (Silicone resin 3)

Preparation of a silicone resin from (CH$_3$)SiCl$_3$ and (CH$_3$)$_3$SiCl 420 g (2.81 mol) of methyltrichlorosilane and 12 g (0.11 mol) of trimethylchlorosilane were hydrolysed in 1.9 litres of water, 335 g of xylene and 335 g of n-butanol as in Example 1. The aqueous phase was separated off and the solution, which was still acid, was stirred at 80° C. for 30 minutes and washed until neutral, and xylene-butanol was distilled off to give rise to a 75% resin solution.

In the solvent-free state, silicone resin (3) is a solid having a softening temperature of 80° to 100° C. and a density of 1.15 g/cm$^3$. $^1$H NMR (300 MHz, CDCl$_3$, ppm): δ 0.15 (s, SiCH$_3$, Int: 149), 0.90 (mult, O(CH$_2$)$_3$CH$_3$, Int. 6), 1.35, 1.50 (mult, OCH$_2$(CH$_2$)$_2$CH$_3$, Int. 8), 2.2 (br, SiOH, Int: 2.3), 3.7 (mult, OCH$_2$(CH$_2$)$_2$CH$_3$, Int: 4). According to $^{29}$Si-NMR, the silicone resin contains 1.08 methyl groups per silicon atom. The molecular formula can be calculated from these values to be (CH$_3$)$_{1.08}$Si(O(CH$_2$)$_3$CH$_3$)$_{0.043}$(OH)$_{0.017}$O$_{1.43}$. The ceramic yield after pyrolysis at temperatures of up to 1000° C. (heating rate 1° C./min) in air was 79.5% by weight.

Example 4 (Silicone resin 4)

Preparation of the QM silicone resin

A mixture of 1500 g (10.0 mol SiO$_2$) of Dynasil 40, 600 g (7.4 mol Me$_3$SiO$_{1/2}$) of hexamethyldisiloxane, 2.4 g of conc. H$_2$SiO$_4$, 1.2 g of C$_4$F$_9$SO$_3$H and 1700 g of xylene was introduced into a 6-litre 4-necked flask equipped with stirrer, water cooler, thermometer and dropping funnel. The mixture was first boiled under reflux for one hour and then hydrolysed with 263 g of water (about 20% excess) at a temperature of 90° to 100° C. The reaction mixture was then stirred for 2 hours at 100° C. and neutralised for one hour with 21.7 g (0.0265 mol) of sodium acetate at 100° C. 1600 ml of xylene were then distilled off and the product was filtered. 1580 g of a 75% solution of the silicone resin were obtained.

In the solvent-free state, silicone resin (4) is a solid having a softening temperature of 80° to 100° C. and a density of 1.20 g/cm$^3$, an SiOH content (Karl Fischer) of less than 0.01% and an ethoxy content (Zeisel) of 11.5%. $^1$H NMR (300 MHz, CDCl$_3$, ppm): δ 0.15 (s, SiCH$_3$, Int: 149.8), 1.20 (br. s, OCH$_2$CH$_3$, Int: 21.5), 3.80 (br. s, OCH$_2$CH$_3$, Int: 14.5). IR (KBr, cm$^{-1}$): 3450 (br, m), 2970 (sh, m) 2910 (sh, w), 1260 (sh, s), 1050–1200 (br, vs), 870 (sh, s), 850 (sh, s), 760 (sh, m). The molecular formula can be calculated from these values to be (CH$_3$)$_{1.46}$Si(OCH$_2$CH$_3$)$_{0.21}$O$_{1.16}$.

The ceramic yield after pyrolysis at temperatures of up to 1000° C. (heating rate 2° C./min) in air was 75.3%.

Example 5 (Silicone resin 5)
Preparation of a QM silicone resin 1542 g (10.28 mol $SiO_2$) of Dynasil 40 and 583 g (7.2 mol $Me_3SiO_{1/2}$) of hexamethyldisiloxane were hydrolysed with 270 g of water as in Example 4, neutralised with sodium acetate, concentrated and filtered. 1600 g of 75% solution of the silicone resin are obtained.

In the solvent-free state, silicone resin (5) is a solid having a softening temperature of 100° to 110° C., an SiOH content (Karl Fischer) of less than 0.01% and an ethoxy content (Zeisel) of 11.8%. $^1H$ NMR (300 MHz, $CDCl_3$, ppm): δ 0.15 (s, $SiCH_3$, Int: 149.2), 1.20 (br. s, $OCH_2CH_3$, Int: 21), 3.80 (br. s, $OCH_2CH_3$, Int: 14.5). IR (KBr, $cm^{-1}$): 3450 (br, m), 2970 (sh, m), 2910 (sh, w), 1260 (sh, s), 1050–1200 (br, vs), 870 (sh, s), 850 (sh, s), 760 (sh, m). The overall formula can be calculated from these values to be $(CH_3)_{1.45}Si(Oct)_{0.20}O_{1.17}$.

The ceramic yield after pyrolysis at temperatures of up to 1000° C. (heating rate 2° C./min) in air was 76.7%.

Example 6 (Silicone resin 6)
Preparation of a QM silicone resin 1154 g (7.69 mol $SiO_2$) of Dynasil 40, 311.5 g (3.85 mol $Me_3SiO_{1/2}$) of hexamethyldisiloxane and 428 g (5.77 mol $Me_2SiO$) of octamethylcyclotetrasiloxane were hydrolysed with 202 g of water as in Example 4, neutralised with sodium acetate, concentrated and filtered. 1300 g of a 54% solution of the silicone resin are obtained.

In the solvent-free state, silicone resin (6) is a solid having a softening temperature of 80 to 90° C., an SiOH content (Karl Fischer) of less than 0.01% and an ethoxy content (Zeisel) of 8.3%. $^1H$ NMR (300 MHz, $CDCl_3$, ppm): δ 0.15 (s, $SiCH_3$, Int: 147.9), 1.20 (br. s, $OCH_2CH_3$, Int: 15.3) 3.80 (br.s $OCH_2CH_3$, Int: 11). IR (Film, $cm^{-1}$): 2970 (br, m), 2905 (sh, w), 1400–1450 (br, w), 1265 (sh, s), 1050 to 1200 (br, vs), 850 (sh, s), 810 (sh, s), 760 (sh, m).

The ceramic yield after pyrolysis at temperatures of up to 1000° C. (heating rate 2° C./min) in air was 76.5%.

Example 7 (Silicone resin 7)
Preparation of a QM silicone resin 1500 g (10.0 mol $SiO_2$) of Dynasil 40 and 516 g (6.4 mol $Me_3SiO_{1/2}$) of hexamethyldisiloxane were hydrolysed with 290 g of water as in Example 4, neutralised with sodium acetate, concentrated and filtered. 1600 g of 75% solution of the silicone resin are obtained.

In the solvent free state, silicone resin (7) is a solid having a softening temperature of 220° C., an SiOH content (Karl Fischer) of less than 0.01% and an ethoxy content (Zeisel) of 12.5%. $^1H$ NMR (300 MHz, $CDCl_3$, ppm): δ 0.15 (s, $SiCH_3$, Int: 149.2), 1.20 (br. s, $OCH_2CH_3$, Int: 27) 3.80 (br. s $OCH_2CH_3$, Int: 18). IR (KBr, $cm^{-1}$): 3450 (br, m), 2970 (sh, m), 2910 (sh, w), 1260 (sh, s), 1050–1200 (br, vs), 870 (sh, s), 850 (sh, s), 760 (sh, m). The molecular formula can be calculated from these values to be $(CH_3)_{1.16}Si(OCH_2CH_3)_{0.21}O_{1.31}$.

The ceramic yield after pyrolysis at temperatures of up to 1000° C. (heating rate 2° C./min) in air was 78.7%.

Example 8 (Moulding compound of silicone resin 1)

395 g of $Al_2O_3$ powder, 100 g of the above 64% resin solution from Example 1 (64 g resin), 4 g of calcium stearate and 8 g of polyethylene oxide were introduced in to a two-shaft kneader. The mixture was kneaded for 15 minutes at 110° C. and reduced pressure to remove the solvent. Kneading was then continued for a further 15 minutes without vacuum. A plastic moulding compound which had good flow properties and solidified on cooling was obtained. The volumetric proportion of $Al_2O_3$ in the moulding compound was calculated to be about 61.5%.

The moulding compound was compressed to form pellets under a pressure of 500 bar at about 120° C. A pellet measuring 13×2.0 mm was fired in air at temperatures of up to 1000° C. over a period of 6.0 hours in a stepwise heating programme (25°–150° C./25 min; 150°–400° C./250 min; 400°–600° C./65 min; 600°–1000° C./20 min). The fired pellet had great strength and was free from macroscopic faults. The weight loss during firing was 5.5%.

Examples 9–13

Various moulding compounds were prepared in a kneader from $Al_2O_3$ powder and silicone resin solution 1 as in Example 8. The compositions of these moulding compounds are shown in Table 1. The moulding compounds were compressed to pellets and fired in air, Table 2.

TABLE 1

Composition of the moulding compounds

| No. | Temp. °C. | $Al_2O_3$ g | Resin solution g | Ca Stearate g | Other data |
|---|---|---|---|---|---|
| 9 | 105 | 415 | 94 | 5 | 8 g hard paraffin I |
| 10 | 105 | 435 | 100 | 5 | 2 g polyethylene oxide |
| 11 | 105 | 415 | 100 | 5 | 8 g siloxane copolymer |
| 12 | 130 | 415 | 86 | 5 | 9 g hard paraffin I<br>8.5 g polystyrene |
| 13 | 120 | 375 | 100 | | 9 g polar polyolefin wax |

TABLE 2

Results of firing[a]

| No. | Size mm | Temperature programme | Firing time h | Weight Loss % | Appearance |
|---|---|---|---|---|---|
| 8 | 10 4.5 | 1° C./min to 1000° C. | 16.25 | 5.1 | faultless |
| 9 | 13 × 2.5 | 1° C./min to 1000° C. | 16.25 | 5.9 | faultless |
| 10 | 13 × 2.5 | 1° C./min to 1000° C. | 16.25 | 4.2 | faultless |
| 11 | 13 × 2.5 | 25–150° C./25 min, 150–400° C./250 min, 400–600° C./65 min, 600–1000° C./20 min | 6.0 | 3.5 | faultless |
| 12 | 13 × 2.5 | 1° C./min to 1000° C. | 16.25 | 7.1 | faultless |
| 13 | 13 × 2 | 1° C./min to 1000° C. | | 5.5 | faultless |

[a]Temperature of kneader

Example 14 (Moulding compound of silicone resin 2)

32.5 g (25 g resin) of silicone resin solution 2, 22.5 g of montan wax and 2.5 g of stearic acid amide were introduced into a kneader and heated to 120° C. 222.5 g of $Al_2O_3$ powder were then mixed in and the solvent was removed by flushing with $N_2$. A further 85 g of $Al_2O_3$ powder was incorporated gradually. Kneading was then continued for a further 60 minutes. A plastic moulding compound which had good flow properties and solidified on cooling was obtained. The volumetric proportion of $Al_2O_3$ in the moulding compound was calculated to be about 62.3%.

The moulding compound was compressed to pellets at about 120° C. A pellet measuring 13×2.0 mm was fired in air at temperatures of up to 1000° C. in a heating programme of 1° C./min. The fired pellet had great strength and was free from macroscopic faults. The weight loss during firing was 8.4%.

Example 15 (Moulding compound of silicone resin 4)

41.7 g (25 g resin) of a 60% silicone resin solution from Example 4, 24.5 g of montan wax and 0.5 g of sodium stearate were introduced into a kneader and mixed at 120° C. for 5 minutes. 220 g of $Al_2O_3$ powder were then added and the mass was kneaded for 30 minutes with constant flushing with $N_2$ to evaporate the xylene. A further 117 g of $Al_2O_3$ powder was added portionwise to the mass which was kneaded for a total of 1 hour. A plastic moulding compound which had good flow properties and solidified on cooling was obtained. The volumetric proportion of $Al_2O_3$ in the moulding compound was calculated to be about 64.9%.

The moulding compound was compressed to pellets under a pressure of 100 bar at about 120° C. A pellet measuring 13×2.0 mm was fired in air at temperatures of up to 1000° C. in a heating programme of 1° C./min to 100° C., 0.5° C./min to 400° C., 1° C./min to 600° C. and 5° C./min to 1000° C. The fired pellet had great strength and was free from macroscopic faults. The weight loss during firing was 9.0%.

Examples 16 to 19

Various moulding compounds were prepared in a kneader as in Example 15 from $Al_2O_3$ powder, silicone resin and auxiliary substances. The compositions of these moulding compounds are shown in Table 3. The moulding compounds were compressed to pellets and fired in air, Table 4.

TABLE 3

Composition of the moulding compounds

| No. | $Al_2O_3$ g | Silicone resin No. | g | Other data |
|---|---|---|---|---|
| 16 | 328 | 4 | 35 | 10 g montan wax |
|   |   |   |   | 5 g stearic acid amide |
| 17 | 246 | 4 | 35 | 5 g copolymer wax |
|   |   |   |   | 5 g paraffin II |
|   |   |   |   | 5 g stearic acid amide |
| 18 | 311 | 5 | 35 | 5 g paraffin II |
|   |   |   |   | 9.5 g montan wax |
|   |   |   |   | 0.5 g sodium stearate |
| 19 | 252 | 6 | 35 | 5 g copolymer wax |
|   |   |   |   | 9.5 g montan wax |
|   |   |   |   | 0.5 g sodium stearate |

TABLE 4

Results of firing

| No. | Size mm | Firing time[a] h | Wt. loss % | Appearance |
|---|---|---|---|---|
| 15 | 13 × 2 | 16:20 | 9.0 | faultless |
| 16 | 13 × 2 | 16:20 | 6.8 | faultless |
| 17 | 13 × 2 | 16:20 | 8.3 | faultless |
| 18 | 13 × 2 | 16:20 | 7.0 | faultless |
| 19 | 13 × 2 | 16:20 | 8.3 | faultless |

[a]Heating programme: 1° C./min 25–100° C., 0.5° C./min 100–400° C., 1° C./min 400–600° C. and 5° C./min 600–1000° C.

Example 20

As shown in Table 5, a soft resin was always mixed with a hard resin to demonstrate the properties of the mixture.

Example 21

Preparation of a moulding compound from the mixture of silicone resins (1) and (3)

39.1 g (25 g resin) of a 64% resin solution from Example 1, 6.0 g (5.25 g resin) of an 88% resin solution from Example 2, 12.5 g montan wax and 2.5 g of stearic acid amide were introduced into a kneader and mixed at 120° C. for 5 minutes. 200 g of $Al_2O_3$ powder were then added and the mixture was kneaded for 30 minutes with constant flushing with $N_2$ to enable the solvent to evaporate off.

A further 76 g of $Al_2O_3$ powder was added portionwise to the mixture and kneading was carried out for a total of 1 h. A plastic moulding compound is obtained which has good flow properties and becomes solid on cooling.

The moulding compound was compressed to pellets at about 120° C. and 100 bar. The pellets could easily be removed from their moulds and were of great strength. A pellet measuring 13×2.0 mm was fired in air at temperatures of up to 1000° C. in a heating programme of 1° C./min to 100° C., 0.5° C./min to 400° C., 1° C./min to 600° C. and 5° C./min to 1000° C. The fired pellet was of great strength and free from macroscopic faults. The weight lost during firing was 7.2%.

Examples 22–26

Various moulding compounds were prepared in a kneader as as in Example 21 from $Al_2O_3$ powder and various silicone resin mixtures. The compositions of these moulding compounds are shown in Table 6. The moulding compounds were compressed to pellets at about 120° C. The moulding compounds could easily be removed from their moulds and did not stick to the walls of the mould. The compressed moulding compounds differed from one another in hardness. The compressed moulding compounds were progressively harder and more brittle with increasing proportions of silicone resins (3), (4) and (7). The compressed moulding compounds could be fired within a short time to give rise to faultless products, Table 7.

TABLE 5

Properties of the silicone resin mixtures

| Resin 1 (Ex. 1) | Hard resin Ex. No. | % by wt. | Softening Temp., °C. | Viscosity mPa · s, 130° C. | Hardness[a] |
|---|---|---|---|---|---|
| 100 | — | 0 | 55–65 | 500 | — |
| 85 | 3 | 15 | 60–70 |   | — |

TABLE 5-continued

Properties of the silicone resin mixtures

| Resin 1 (Ex. 1) | Hard resin Ex. No. | % by wt. | Softening Temp., °C. | Viscosity mPa · s, 130° C. | Hardness* |
|---|---|---|---|---|---|
| 50 | 3 | 50 | 65–75 | 1080 | + |
| 25 | 3 | 75 | 80–90 | | ++ |
| 85 | 4 | 15 | 60–70 | | — |
| 50 | 4 | 50 | 75–80 | | +/– |
| 75 | 7 | 25 | 80–90 | | +/– |
| 50 | 7 | 50 | 125–135 | | ++ |
| — | 3 | 100 | 80–100 | 6000 | ++ |
| — | 4 | 100 | 80–100 | | ++ |
| — | 7 | 100 | 220 | | ++ |

*Hardness scale: ++: very hard, brittle, +: hard, only slightly plastic, +/–: hard, plastic, –: soft, —: very soft

TABLE 6

Composition of the moulding compounds

| Ex. No. | Al₂O₃ g | Silicone resin No. | g | Other data |
|---|---|---|---|---|
| 22 | 276 | 1 | 17.5 | 12.5 g montan wax |
|  |  | 3 | 17.5 | 2.5 g stearic acid amide |
| 23 | 276 | 1 | 17.5 | 12.5 g montan wax |
|  |  | 4 | 17.5 | 2.5 g stearic acid amide |
| 24 | 276 | 1 | 29.75 | 12.5 g montan wax |
|  |  | 7 | 5.25 | 2.5 g stearic acid amide |
| 25 | 414 | 1 | 27.4 | 18.25 g montan wax |
|  |  | 7 | 27.4 | |
| 26 | 414 | 1 | 18.3 | 36.5 g montan wax |
|  |  | 7 | 18.3 | |

TABLE 7

Results of firing

| Ex. No. | Size mm | Firing time* h | Weight Loss % | Appearance |
|---|---|---|---|---|
| 21 | 13 × 2 | 16:20ᵃ | 7.2 | faultless |
| 22 | 13 × 2 | 16:20 | 7.2 | faultless |
| 23 | 13 × 2 | 16:20 | 7.3 | faultless |
| 24 | 13 × 2 | 16:20 | 7.3 | faultless |
| 25 | 13 × 2 | 11:00ᵇ | 5.8 | faultless |
| 26 | 13 × 2 | 11:00 | 9.4 | faultless |

ᵃHeating programme: 1° C./min 25–100° C., 0.5° C./min 100–400° C., 1° C./min 400–600° C. and 5° C./min 600–1000° C.
ᵇHeating programme: 1° C./min 25–600° C., 4° C./min 600–1000° C.

Example 27

Preparation of a moulding compound from porcelain powder 39.1 g of a 64% resin solution (25 g resin) from Example 1, 10 g of montan wax, 10 g of copolymer wax and 5 g of stearic acid amide were mixed with 253 g of porcelain powder as in Example 21 and kneaded for a total of 1 hour. A plastic moulding compound is obtained which has good flow properties and becomes solid on cooling. The volumetric proportion of powder in the moulding compound is calculated to be about 62%.

The moulding compound has a density of 1.97 g/cm³ and a viscosity of 700 Pa.s at a shearing velocity of 100 s⁻¹ and 350 Pa.s at 700 s⁻¹. The moulding compound was extruded in an injection moulding machine at a temperature of the composition of 130°–140° C., a temperature of the mould of 35° C. and a pressure of 900 bar to form rods measuring 80×20×5 mm. The moulded parts were free from macroscopic faults. The moulded parts could be fired in less than 30 hours to give rise to faultless products. The weight loss was 17.7%.

We claim:

1. Thermoplastic moulding composition containing at least one sinterable ceramic or metal powder and a mixture of thermoplastic binders consisting of at least one thermoplastic silicone resin and at least one thermoplastic organic binder, wherein the silicone resin has a softening point of 40° to 150° C. and corresponds to the average formula

$$R_a^1 Si(OH)_b (OR^2)_c O_{(4-a-b-c)/2} \quad (I)$$

wherein a is in the range of 0.95 to 1.2, c is in the range of 0 to 0.2 the sum a+b+c is 1.05 to 1.5 the sum b+c is at most 0.3

$R^1$ denotes methyl and $R^2$ denotes one or more of the $C_1$–$C_{18}$-alkyl radicals, wherein the following units are present from 80 to 98 mol-% of $CH_3SiO_{3/2}$ units, from 0 to 20 mol-% of $(CH_3)_2SiO$ units, and from 0 to 10 mol-% of $(CH_3)_3SiO_{1/2}$ units, and wherein the moulding composition consists of 50 to 70 volume % of sinterable powder.

2. A thermoplastic moulding composition according to claim 1 wherein the thermoplastic organic binder consists of organic waxes or thermoplastic organic polymers.

3. A thermoplastic moulding composition according to claim 1, containing in addition sintering auxiliaries, flow improvers and mold release agents.

4. A thermoplastic moulding composition according to claim 1 in which the thermoplastic resin component is a mixture of at least two silicone resins, a first silicone resin having a softening temperature of from 30° to 120° C. and a second silicone resin having a softening temperature of at least 60° C., the difference between the softening temperatures of said first and second silicone resins being at least 20° C.

5. The composition of claim 1 which further comprises an organic thermoplastic binder selected from the organic polymers and waxes that have a softening temperature of from 40° C. to 200° C.

6. The composition of claim 4 which further comprises an organic thermoplastic binder selected from the organic polymers and waxes that have a softening temperature of from 40° C. to 200° C.

7. The composition of claim 1 which further comprises an auxiliary agent selected from sintering auxiliaries, flow improvers and mold release agents.

8. The composition of claim 4 which further comprises an auxiliary agent selected from sintering auxiliaries, flow improvers and mold release agents.

9. A process for the preparation of a thermoplastic moulding composition of claim 1 which comprises mixing said sinterable powder with said mixture of thermoplastic binders, sintering auxiliaries and other auxiliary agents at temperatures above the softening temperature of the binder.

10. A process for the preparation of sintered bodies, comprising moulding a thermoplastic moulding composition by injection moulding, then first firing said moulded composition at a temperature from 200° C. to 1000° C. and then sintering at temperatures of from 1000° C. to 2000° C., wherein said thermoplastic moulding composition is a thermoplastic moulding composition containing at least one sinterable ceramic or metal powder and a mixture of thermoplastic binders consisting of at least one thermoplastic silicone resin and at least one thermoplastic organic binder, wherein the silicone resin has a softening point of 40° to 150° C. and corresponds to the average formula $$R^1_a Si(OH)_b(OR^2)_c O_{(4-a-b-c)/2} \quad (I)$$

wherein a is in the range of 0.95 to 1.2 c is in the range of 0 to 0.2 the sum a+b+c is 1.05 to 1.5 the sum b+c is at most 0.3

$R^1$ denotes methyl and $R^2$ denotes one or more of the $C_1$–$C_{18}$-alkyl radicals, and with the proviso that at least 70% of the organic groups $R^1$ and $R^2$ are methyl groups, and wherein the moulding composition consists of 50 to 70 volume % of sinterable powder.

* * * * *

UNITED STATES PATENT AND TRADEMARK OFFICE
CERTIFICATE OF CORRECTION

PATENT NO : 5,741,842
DATED : April 21, 1993
INVENTOR(S): Huggins, et al.

It is certified that error appears in the above-identified patent and that said Letters Patent are hereby corrected as shown below:

Col. 16, line 12  Delete " $R_a{}^1Si(OH)_b(OR^2)_cO_{(4-a-b-c)/2}$ " and substitute -- $R^1{}_aSi(OH)_b(OR^2)_cO_{(4-a-b-c)/2}$ --

Col. 17, line 9  Delete " $R_a{}^1Si(OH)_b(OR^2)_cO_{(4-a-b-c)/2}$ " and substitute -- $R^1{}_aSi(OH)_b(OR^2)_cO_{(4-a-b-c)/2}$ --

Signed and Sealed this

Fifteenth Day of May, 2001

Attest:

NICHOLAS P. GODICI

Attesting Officer        Acting Director of the United States Patent and Trademark Office